Figure 1:
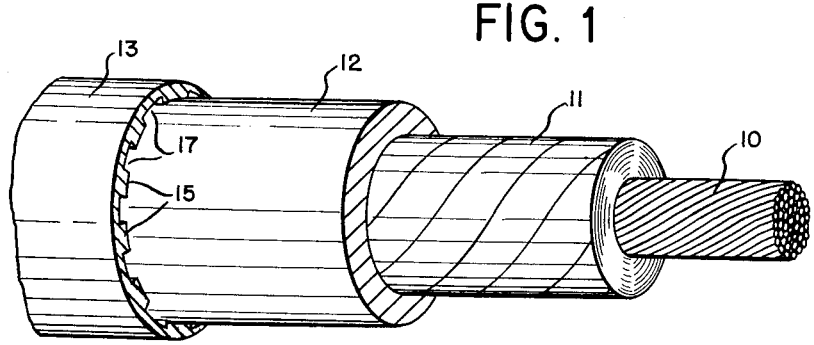

April 16, 1963     E. L. KOLMORGEN     3,086,069

LEAKAGE MONITORING MEANS FOR ELECTRIC POWER CABLES

Filed April 1, 1960

INVENTOR
Edward L. Kolmorgen
BY
ATTORNEYS

000
United States Patent Office 3,086,069
Patented Apr. 16, 1963

3,086,069
LEAKAGE MONITORING MEANS FOR ELECTRIC POWER CABLES
Edward L. Kolmorgen, Palo Alto, Calif., assignor to Anaconda Wire and Cable Company, a corporation of Delaware
Filed Apr. 1, 1960, Ser. No. 19,239
6 Claims. (Cl. 174—11)

This invention relates to monitoring means for warning of potential failure of electric power cables. More particularly, it relates to leakage monitoring means for sheathed power cables wherein a monitoring fluid is contained about the cable sheath within an outer jacket to indicate leaks in the outer jacket.

In many instances, sheathed power cables are laid in underground ducts, are buried in the earth, or are used in aerial or submarine installations. Under these conditions of operation, the problem of leakage of moisture into the cables is acute in practically every installation. It is the function of the cable sheath, of course, to prevent leakage, but nonetheless leaks do occur, and when moisture penetrates into the cable insulation through such leaks the cable fails and it becomes necessary to remove the entire affected length of cable and discard it.

It is the primary purpose of this invention to provide means for signalling potential leakage before, not after, it occurs, so that the situation may be corrected before substantial damage is done to the cable. Consequently, the invention provides monitoring means for anticipating and indicating the mere probability of a leak. In the absence of any signal by the monitoring means, there is complete assurance that no water can gain access to the interior of the cable. However, when the monitoring means does indicate the likelihood of a leak, suitable steps may then be taken to eliminate the dangerous condition before any severe damage is done and a prolonged shut-down of the cable is caused.

The new leakage monitoring means is combined with an electric power cable which includes a normally continuous protective sheath. Broadly stated, the monitoring means comprises an extended outer jacket surrounding the sheath. The jacket is of substantially lighter construction than the sheath. Together they define at least one channel extending substantially throughout the length of the jacket. A monitoring fluid is contained in the channel for indicating leaks in the outer jacket.

With the above-described monitoring means applied about the outside of a typical cable sheath, an effective advance warning will be given whenever the outer jacket is punctured and the sheath is in danger of failure. The monitoring fluid may be kept at a pressure different from atmospheric and means may be included for indicating changes in its pressure, so that if a fault occurs in the jacket it will be signalled by the pressure variation. Then, before there is any leakage through the sheath itself, repairmen can locate the fault in the jacket and seal it. In practically no case can moisture which may penetrate a leak in the jacket reach a fault in the sheath (if there be any in it) before this repair work is done, so that before substantial damage can be caused to the cable the situation may be corrected and the jacket restored.

The outer jacket of the invention may be of lead or polymeric material in order to resist destructive weathering by air or water. Polyethylene is particularly advantageous for the polymeric material. In any case, the jacket is of substantially lighter material than the cable sheath because the pressure of the monitoring fluid need only be great enough to be noticeably changed by a puncture or other fault in the jacket. The monitoring fluid may also be a tell-tale gas containing radio-isotopes, mercaptans, Freon or the like, the escape of which can be noted by any suitable detecting means. If the sheathed cable contains an insulating fluid, the monitoring fluid may have the same insulating characteristics so that if they comingle there is no reduction in the insulating ability of the cable.

Figure 2:
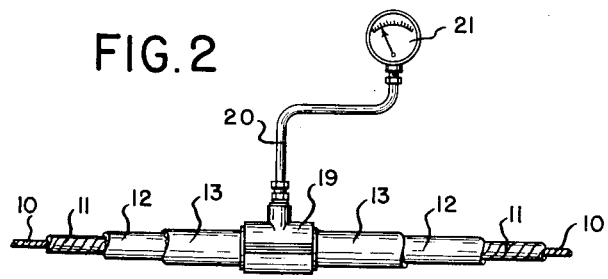
Figure 3:
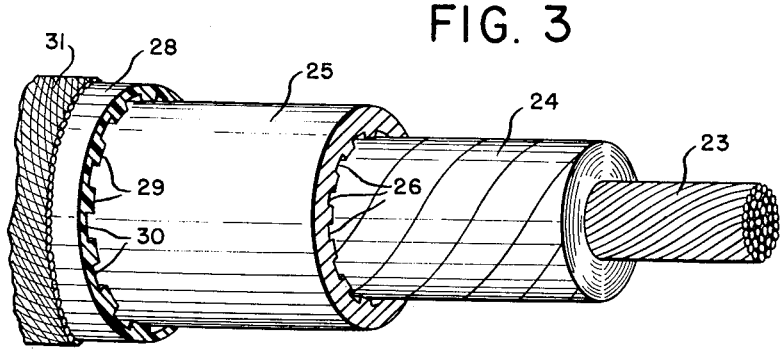

A preferred embodiment of the new leakage monitoring means is described hereinbelow with reference to the accompanying drawing, wherein FIG. 1 is a perspective view of a section of a solid-type paper-lead power cable equipped with the new monitoring means;

FIG. 2 is a schematic elevation partly broken away of means for indicating changes in the pressure of the monitoring fluid; and FIG. 3 is a perspective view of a section of an oil-filled sheathed power cable equipped with another embodiment of the new monitoring means.

Referring first to FIG. 1, the cable includes a single inner multi-strand conductor 10 though the new monitoring means may readily be associated with cables having more than one conductor. Surrounding the conductor 10 throughout its length is a helical wrapping of paper tape 11 which forms a layer of porous insulation. In this embodiment, the paper tape 11 is saturated with a dielectric hydrocarbon oil to form what is known as a solid-type cable. A close-fitting lead sheath 12 is extruded about the paper wrapping 11 after the oil impregnation of the latter. Various elements such as shielding tape and the like are often also included in solid-type cables of this sort, but for purposes of simplification these further elements have not been shown in the drawing. This particular sheathed cable is chosen only as one example of the types with which the new monitoring means may be used.

As provided by the invention, an outer jacket 13 is extruded about the lead sheath 12 substantially throughout its length. The jacket 13 is also of lead and is thus resistant to attack by air and water. A plurality of longitudinal ridges 15 are formed along the inside surface of the jacket 13 during its extrusion and are uniformly shaped and spaced apart about the inner circumference of the jacket. As shown in FIG. 1, the extended faces of the ridges 15 are disposed closely against the outside surface of the lead sheath so that a plurality of uniformly shaped, equally spaced longitudinal channels 17 are defined between the jacket 13 and the sheath 12.

The lead jacket 13 is considerably lighter in construction than the lead sheath 12 because its primary function is to contain a monitoring fluid within the channels 17 and not to duplicate the structural protection provided by the sheath. The monitoring fluid may be either above or below atmospheric pressure but not to the extent that it unduly stresses the jacket 13. Consequently, the jacket 13 is less expensive and adds very little to the diameter of the cable.

The remote ends of the channels 17 are sealed in any suitable fashion and the monitoring fluid is pumped into them after the cable is installed. As shown in FIG. 2, means are provided at some point along the length of the cable to measure the pressure of the fluid in the channels 17. Hence, a bushing 19 is fitted about the cable in sealing engagement therewith. Within the bushing 19, an annular portion of the jacket 13 may be removed so that each of the channels 17 within the jacket communicates with the interior of the bushing 19. Extending from the bushing 19 in communication with the channels 17 is a conduit 20 which leads to a pressure gauge 21 adapted to indicate the pressure of the monitoring fluid in the channels 17.

If the monitoring fluid is a liquid, it may be advantageous that it be a dielectric hydrocarbon oil having the same insulating characteristics as the oil impregnating the paper wrapping 12 in the cable. When both the monitoring and insulating fluids have the same insulating characteristics, there is no danger that the dielectric properties of the cable will be impaired in the event that the two fluids are comingled.

In operation, the monitoring fluid is held at a constant nominal pressure in the channel 17. So long as the monitoring fluid remains at its given nominal pressure, there is complete assurance that the outer jacket 13 is intact and that the lead sheath 12 is not exposed to moisture. If a leak does occur in the outer jacket 13, however, it is quite probable water can enter the channel 17 into contact with the lead sheath 12 and eventually leak into the inner insulation of the cable. This danger of probable leakage is immediately indicated by a change in the reading of the pressure gauge 21 from the normally constant nominal level. On the basis of this indication, repairmen can search for and locate the break in the jacket and repair it before the cable is severely damaged. The cable need be taken out of operation only very briefly and no replacement of any part of the cable is required.

Alternatively, a leak may develop in the lead sheath 12, in which case the monitoring fluid pressure would again change. It is in an instance of this sort that identical insulating characteristics of the monitoring and insulating fluids is desirable because the monitoring fluid is comingled with the insulating fluid within the lead sheath. Again, the situation may be corrected by suitable repairs to the lead sheath before there is an opportunity for water to leak therethrough into the interior of the cable. As before, no substantial damage is done to the cable and no prolonged shut-down is required.

Turning now to FIG. 3, another embodiment of the new monitoring means is shown, this time in combination with an oil-filled cable. In this cable, an inner conductor 23 is surrounded by a layer of paper insulation 24 throughout its length and the paper insulation, in turn, is surrounded by an extruded lead sheath 25. Longitudinal grooves 26 are formed on the inside surface of the lead sheath 25 throughout its length so that a hydrocarbon oil may be forced under pressure through the grooves 26 to permeate the paper wrapping 24. Again, this particular form of cable is shown only for illustration.

In accordance with the invention, an outer polymeric jacket 28 is extruded about the lead sheath 25 substantially throughout its length. The jacket 28 is advantageously of polyethylene and is formed about its inside surface with a plurality of longitudinal ridges 29. The faces of the ridges 29 lie tightly against the outside surface of the sheath 25 so that a plurality of uniformly shaped, equally spaced longitudinal channels 30 are defined between the adjacent ridges. When the cable of FIG. 3 is installed, the ends of the channels 30 are sealed in any suitable fashion and a monitoring fluid is pumped into them. Means for measuring the pressure of the monitoring fluid in the channels 30 may then be provided as shown in FIG. 2.

The monitoring fluid may be a liquid or gas or a telltale medium such as those mentioned previously. Considering that a gas is to be used as a monitoring fluid, it may be maintained at a pressure above or below atmospheric. While the stress on the jacket 28 should be minimal, it may be helpful to cover the jacket with an outer reinforcing element, such as the metal braid 31. This permits the jacket to be made substantially lighter in construction than the sheath 25.

During operation, a change in the nominal pressure of the monitoring fluid in the channels 30, or detection of leaking tell-tale fluid, indicates that a leak has occurred in either the jacket 28 or sheath 25. With potential leakage into the interior of the cable thus signalled, repairs can be made to the lead sheath before failure occurs. As a result, no substantial damage is caused to the cable and it is shut-down for the necessary repairs only very briefly.

It is obvious, of course, that certain modifications and refinements can be made in these basic examples of the invention without departing from the new concept. For instance, in place of the pressure gauge 21, a visible or audible alarm system may be provided to more emphatically signal the probability of a leak. Also, means could be provided to record whatever changes take place in the pressure indicated by the gauge 21 so that only a periodic check on the condition of the cable would be necessary. The new monitoring system is also applicable to cables containing pressurized gas; to cables sheathed in rubber, or to other types of cable which includes a moisture-proof sheath. The jackets 13 and 28, of course, may be formed on their inside surfaces in a manner other than that shown in order to provide suitable channels about the respective lead sheaths.

I claim:

1. An electric power cable comprising a normally continuously impermeable protective sheath, a leakage monitoring outer impermeable jacket surrounding said sheath substantially throughout its length, said jacket being of substantially lighter construction than said sheath, the inside surface of said jacket being formed with a plurality of inwardly extending and circumferentially spaced longitudinal ridges, said jacket and sheath together defining a plurality of channels between said ridges extending longitudinally throughout the length of said jacket, a monitoring fluid contained in said jacket at a pressure normally differing from atmospheric, and pressure responsive means for indicating changes in the pressure of said monitoring fluid and thus indicating leaks in said outer jacket.

2. An electric cable according to claim 1 wherein said monitoring fluid is a gas normally above atmospheric pressure.

3. An electric cable according to claim 1 wherein said monitoring fluid is a gas normally below atmospheric pressure.

4. An electric cable according to claim 1 wherein said outer jacket is of lead.

5. An electric cable according to claim 1 wherein said outer jacket is of polymeric material.

6. An electric cable according to claim 5 wherein a metallic reinforcing element is disposed about said polymeric jacket.

References Cited in the file of this patent

UNITED STATES PATENTS

| | | |
|---|---|---|
| 1,849,873 | Hochstadter | Mar. 15, 1932 |
| 1,944,003 | Del Mar | Jan. 16, 1934 |
| 2,079,856 | Hochstadter et al. | May 11, 1937 |
| 2,151,092 | Dunsheath | Mar. 21, 1939 |
| 2,432,568 | Gambitta | Dec. 16, 1947 |
| 2,767,392 | Szwargulski | Oct. 16, 1956 |